(12) United States Patent
Mueller et al.

(10) Patent No.: US 7,883,056 B2
(45) Date of Patent: Feb. 8, 2011

(54) INSULATION ARRANGEMENT FOR THE INTERNAL INSULATION OF A VEHICLE

(75) Inventors: Rainer Mueller, Rosengarten (DE); Peter Turanski, Suestedt (DE); Wilko Oestereich, Bremen (DE); Thorsten Reinelt, Stuhr (DE)

(73) Assignee: Airbus Deutschland GmbH, Hamburg (DE)

( * ) Notice: Subject to any disclaimer, the term of this patent is extended or adjusted under 35 U.S.C. 154(b) by 277 days.

(21) Appl. No.: 10/596,418

(22) PCT Filed: Jan. 5, 2005

(86) PCT No.: PCT/EP2005/000045

§ 371 (c)(1),
(2), (4) Date: Sep. 1, 2006

(87) PCT Pub. No.: WO2005/068291

PCT Pub. Date: Jul. 28, 2005

(65) Prior Publication Data

US 2007/0018042 A1   Jan. 25, 2007

Related U.S. Application Data

(60) Provisional application No. 60/600,107, filed on Aug. 9, 2004.

(30) Foreign Application Priority Data

Jan. 5, 2004   (DE) .................. 10 2004 001 083
Jan. 5, 2005   (WO) .................. PCT/EP05/00045

(51) Int. Cl.
*B64C 1/40*   (2006.01)

(52) U.S. Cl. ........................ 244/119; 428/72

(58) Field of Classification Search .................. 244/119, 244/123.5, 129.1, 133; 428/98, 921, 124, 428/920, 72, 74

See application file for complete search history.

(56) References Cited

U.S. PATENT DOCUMENTS 2,342,839 A  *  2/1944  Byers .................. 428/126

(Continued)

FOREIGN PATENT DOCUMENTS

DE   3111596 A1   10/1982

(Continued)

*Primary Examiner*—Timothy D Collins
*Assistant Examiner*—Brian M O'Hara
(74) *Attorney, Agent, or Firm*—Christopher Paradies; Fowler White Boggs P.A.

(57) ABSTRACT

The present invention relates to an insulation structure for the internal insulation of a vehicle. The insulation structure is improved in such a way that using it a fire incursion of the flames of a source of fire acting from outside the vehicle environment into the vehicle interior is excluded as much as possible, an increase of the fire protection safety for separate interior regions lying proximal to a structure external skin being implemented by the type of the film insulation of the insulation package. The insulation structure comprises an insulation package (3), in which an insulation core (1) is embedded, and a film (11). The insulation package (3) is positioned inside an intermediate space which encloses internal paneling and an external skin. It is completely enclosed by the film (11). The film (11) is implemented using a burn-through safe film material, which is an obstruction to a flaming fire, to which a film surface region of this film is subjected during an occurring fire catastrophe.

16 Claims, 3 Drawing Sheets

U.S. PATENT DOCUMENTS

| | | | |
|---|---|---|---|
| 3,003,902 A * | 10/1961 | McDuff | 428/75 |
| 3,567,162 A | 3/1971 | Lea | |
| 4,598,007 A | 7/1986 | Kourtides et al. | |
| 4,805,366 A | 2/1989 | Long | |
| 4,842,465 A | 6/1989 | Pease et al. | |
| 4,907,923 A | 3/1990 | McGrath, Jr. | |
| 5,298,694 A * | 3/1994 | Thompson et al. | 181/286 |
| 5,759,659 A * | 6/1998 | Sanocki et al. | 428/74 |
| 5,866,231 A | 2/1999 | Bodin et al. | |
| 5,987,833 A * | 11/1999 | Heffelfinger et al. | 52/406.2 |
| 6,000,107 A | 12/1999 | West | |
| 6,122,387 A | 9/2000 | Borchers et al. | |
| 6,177,157 B1 * | 1/2001 | Cota | 428/34.1 |
| 6,231,944 B1 * | 5/2001 | Holt | 428/57 |
| 6,314,630 B1 | 11/2001 | Munk et al. | |
| 6,358,591 B1 * | 3/2002 | Smith | 428/74 |
| 6,442,806 B1 | 9/2002 | Wesson | |
| 6,627,561 B1 * | 9/2003 | Wulliman et al. | 442/1 |
| 6,777,103 B2 | 8/2004 | Merkley et al. | |
| 7,083,147 B2 * | 8/2006 | Movsesian et al. | 244/121 |
| 7,186,360 B2 | 3/2007 | Benitsch | |
| 7,282,252 B2 * | 10/2007 | Fay et al. | 428/137 |
| 2005/0211839 A1 * | 9/2005 | Movsesian et al. | 244/119 |

FOREIGN PATENT DOCUMENTS

| | | |
|---|---|---|
| DE | 19832000 C1 | 11/1999 |
| EP | 1134479 A2 | 9/2001 |
| EP | 1134479 A3 | 9/2001 |
| EP | 1164006 A1 | 12/2001 |
| WO | 91/12131 A1 | 8/1991 |
| WO | 00/75012 | 12/2000 |
| WO | WO-00/75012 A1 | 12/2000 |

* cited by examiner

PRIOR ART

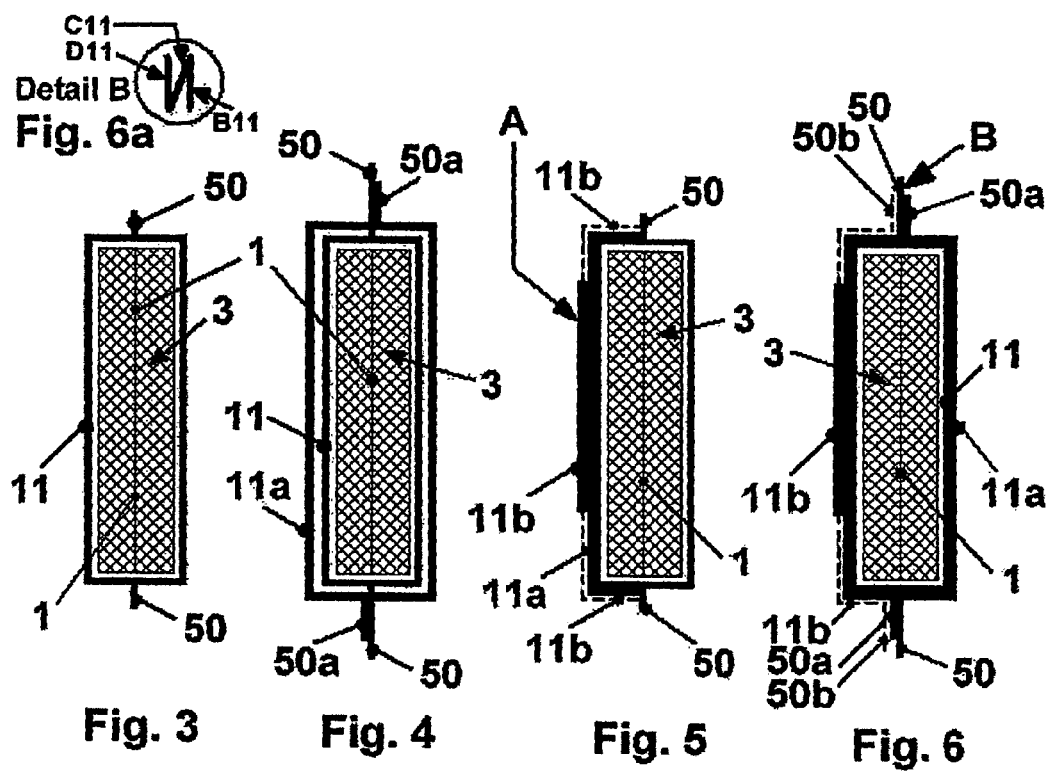

US 7,883,056 B2

INSULATION ARRANGEMENT FOR THE INTERNAL INSULATION OF A VEHICLE

CROSS REFERENCE TO RELATED APPLICATIONS

The present application claims priority of DE 10 2004 001 083 filed Jan. 5, 2004 and U.S. 60/600,107 filed Aug. 9, 2004, which are both hereby incorporated by reference.

FIELD OF THE INVENTION

The present invention relates to insulation such as fire insulation and/or protection. In particular, the present invention relates to an insulation structure for the internal insulation of a vehicle. The insulation structure may be useful for protecting the internal region of a vehicle from a fire incursion from outside the vehicle surroundings.

BACKGROUND OF THE INVENTION

Conventional insulation systems, such as e.g. shown in FIG. 1, essentially comprise a core material, which is embedded in an insulation package and an envelope. The core and insulation materials generally include products of the fiber industry, of which fiber glass materials (glass wool) are used in particular. This material fulfils the requirements in regard to thermal and acoustic insulation. In order to implement mounting (attachment) of the relatively amorphous semi finished products to the vehicle structure, the insulation package (comprising these semi finished products) is enclosed by an envelope film. Reinforcements are attached to the ends of the envelope film in order to thus attach a (therefore complete) insulation package to the structure surfaces of a vehicle with the aid of fasteners.

Insulation packages of this type are attached to the frames of the aircraft fuselage structure by means of fasteners which are typically made of plastic(s), for example, polyamide. The typical insulation systems, which comprise glass wool and simple plastic films, may have a burn-through time of approximately sixty seconds.

In case of fire in an aircraft parked on the ground, i.e. the "post-crash fire scenario" (FIG. 2), burning kerosene may cause the aluminum cells of the aircraft structure and even the fuselage insulation (internal insulation) of the aircraft to burn through. There is always a desire to increase the burn trough time, or to increase the time the structure may withstand the fire.

As mentioned above, typical fasteners of the insulation are made of non-metallic materials (plastics), which are usually not able to resist the fire in case of catastrophe for an extended period of time. Due to this, a collapse of the burning insulation (insulation packages) may occur, because of which uncontrollable obstructions or other fire danger points would (suddenly) be present.

WO 00/75012 A 1 discloses a fuselage insulation for an aircraft fuselage which is specified as "fire-blocking". This publication discloses an insulation package which is positioned as the primary insulation within a spatial region which lies between the fuselage internal paneling and the fuselage external skin. In this case, this insulation package is protected in areas by a film made of fire-blocking material. This fire-blocking film region is directly facing toward the external skin of the aircraft fuselage (as a type of fire protection shield). Neglecting the fact that only insufficient protection of the insulation package and also the fuselage internal region from occurring fire may be provided using this suggestion, since during a fire catastrophe the flames of fire may pass from outside the aircraft through a damaged external skin and may feed on the internal insulation, i.e., would pass through the (only) fire-blocking, but not fire-resistant film upon permanent fire strain, the intended regional positioning of an only fire-blocking film may not be able to ensure fire protection safety in relation to the fuselage inside region for an extended period of time.

SUMMARY OF THE PRESENT INVENTION

According to an exemplary embodiment of the present invention, an insulation structure for the internal insulation of a vehicle is provided, which may be adapted for arrangement in an intermediate space between an internal paneling of the vehicle and an outside or external skin of the vehicle. The insulation structure comprises an insulation package with an insulation core which is embedded in the insulation package. Furthermore, there is a film of a burn-through safe film material, wherein the film material is an obstruction to a fire to which a film surface region of this film is subjected during a fire incident. According to an aspect of the present invention, the insulation package is essentially enveloped by the film.

An exemplary embodiment of the present invention may allow for an improved insulation structure of a vehicle, which is used for internal insulation, in such a way that a fire incursion of the flames of a source of fire acting from outside the vehicle surroundings into the vehicle interior may prevented or may be delayed. Furthermore, it is believed that an increase of the fire protection safety for separate interior regions lying near a structure external skin being implemented through the type of film insulation of the insulation package may be achieved.

BRIEF DESCRIPTION OF THE DRAWINGS

The present invention is described in greater detail with reference to an exemplary embodiment on the basis of the following drawings.

FIG. 3 shows an insulation structure for internal insulation of a commercial aircraft having a burn-through safe film envelope of the insulation package according to an exemplary embodiment of the present invention;

FIG. 4 shows the insulation structure shown in FIG. 3 having a film reinforcement through layered burn-through safe film envelopes according to an exemplary embodiment of the present invention;

FIG. 5 shows a modification of the insulation structure shown in FIG. 4 with the illustration of a partial film envelope through further burn-through safe film envelopes according to an exemplary embodiment of the present invention;

FIG. 6 shows a modification of the insulation structure shown in FIG. 4 with the illustration of a Z-shaped fold (in the example) of a single burn-through safe film according to an exemplary embodiment of the present invention;

FIG. 6a shows an illustration of the details B shown in FIG. 6.

DETAILED DESCRIPTION OF EXEMPLARY EMBODIMENTS

Figure 1:
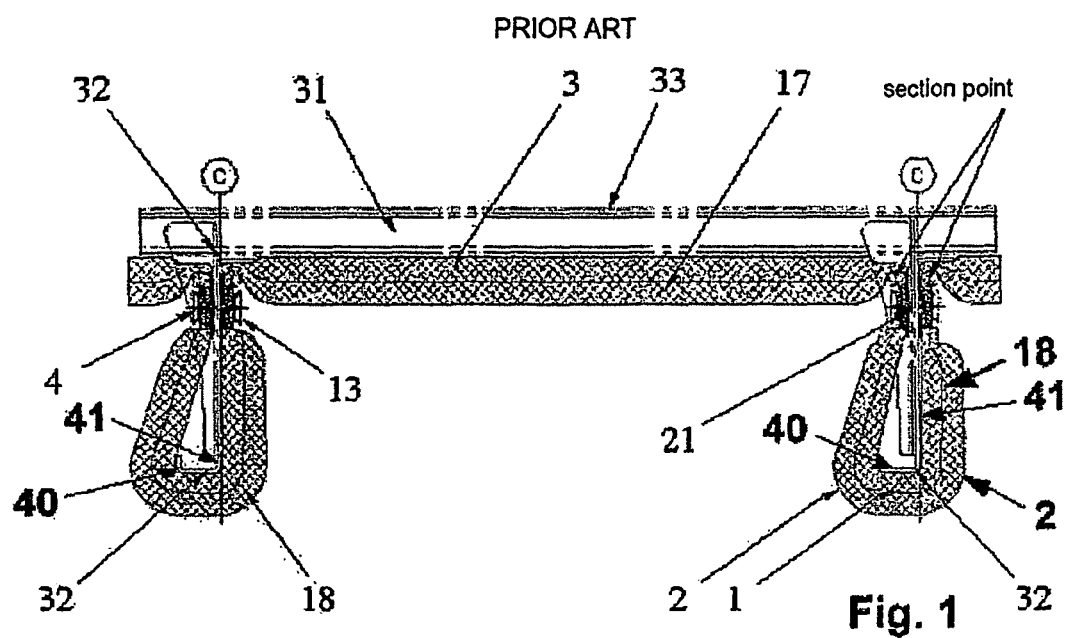
FIG. 1 shows a known fuselage insulation of a commercial aircraft.

In order to make the illustration in FIG. 1, it will also be noted for introductory purposes that in the strength bracing of the aircraft fuselage, the latter has, in addition to stringers 31 which stiffen all external skin panels of an aircraft fuselage structure, multiple frames 32, which are positioned perpendicularly to the aircraft longitudinal axis (not shown) at (approximately) intervals c and/or attached to the stringers 31. A frame girder 40, which is extended parallel to the aircraft longitudinal axis, is integrated on the unattached end of these frames 32, the (unattached free) end of the frame girder 40 being angled perpendicularly to the aircraft longitudinal axis (in this embodiment).

The illustration in FIG. 1 providing the observer with an impression in regard to the position of the (generally numbered) insulation package 3 on the (proximal) outside or external skin 33 of the aircraft. This insulation package 3 is especially implemented in each case having a panel insulation package 17 and a frame insulation package 16, which are both laid separately and attached to (the region proximal to the external skin) of the aircraft fuselage structure (in the region of a jointly used structure support). It may also be seen from FIG. 1 that a panel insulation package 17 is laid between the (two) frames 32 positioned at intervals c proximal to an internal surface region of an external skin panel of the external skin 33 and a frame insulation package 16 is laid on the frame girder 40, which is extended laterally from the frame longitudinal side 41 (and pressing on one side against a frame longitudinal side 41). These two insulation packages are completely enveloped by a film 2. They are positioned inside an intermediate space (not recognizable in FIG. 1), which encloses internal paneling of the aircraft and the external skin panels of the external skin 33.

Figure 2:
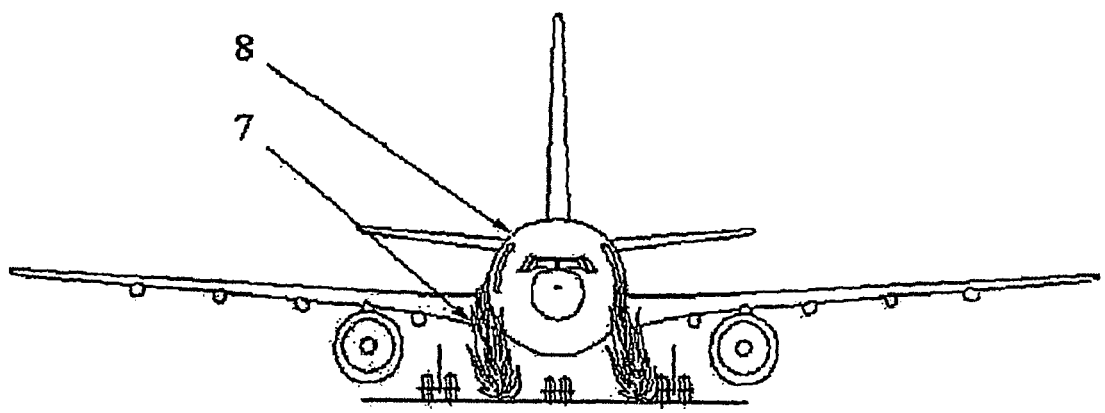
FIG. 2 shows a post-crash fire scenario in a parked commercial aircraft.

In order to clarify improvements which may be achieved with exemplary embodiments of the present invention and an improved fire protection safety for spatial regions to be bulkheaded off, which include an intermediate space, the external skin 33, and internal paneling of the aircraft cabin positioned parallel and with spacing to the latter (defined and lying transversely to the fuselage longitudinal axis), with reference to the illustration in FIG. 2, a fire catastrophe situation in a parked passenger aircraft should be considered. As can be seen in the simulated fire situation, which is referred to as a "post-crash fire scenario" 7 (FIG. 2), in the event of a defective aircraft structure 8 (external skin 33) due to external mechanical action and/or in the event of simultaneously occurring fire effect on this aircraft region because of escaping and/or ignited kerosene inside the fuselage and/or cabin, an emergency situation may occur for passengers and flight personnel. Thus, there is always a need for improved isolation structures or arrangements which may allow to extend a time to withstand a fire or to keep the insulation in place for an extended period of time.

In order to now implement this need for elevating the fire protection safety for separated interior regions proximal to a structure external skin, e.g. of a passenger aircraft, for example, a burn-through safe film 11 made of a fire-resistant film material is suggested, which completely envelops an insulation package 3, traditionally used for internal insulation of an aircraft fuselage, according to the pattern of FIG. 3. Only by enveloping the insulation package 3 in film will one be able to counter the looming dangers in the (non-foreseeable and undesired) fire protection catastrophe case of an aircraft (a vehicle in general) for whatever original (fated) reasons, in order to counter the disadvantages specified at the beginning. A complete enveloping may be preferable.

The further considerations include a typical insulation package 3 comprising fiberglass (glass wool), in which an insulation core 1 is embedded. In this case, the core material fulfills requirements in regard to thermal and acoustic insulation. This is (even here) typically a product of the fiber industry, fiberglass materials mainly being used. The type of attachment of the film-enveloped insulation package 3 and the use of corresponding fasteners in order to at least partially fulfill the need for a fire-protection safety in regard to the overall arrangement of the internal insulation of the aircraft fuselage will not be discussed in greater detail.

The film 11, which is suggested for enveloping the insulation package 3, is (for the intended purpose) to completely envelop the insulation package 3. It is implemented using a burn-through safe material, i.e., using a film material which is safe from burn through of the film wall because of the permanent effect of the flames of a fire 7 on the external surface of the film 11 and/or its film material. This film material is accordingly an absolute obstruction for a flaming fire 7, which a film surface region of this film 11 is subjected to during a fire catastrophe which is shown in FIG. 2.

Since the statement "burn-through safe" is correlated very strongly with the statement "fire-resistant", "fire-resistant" meaning something like "resistant to fire", the film 11 is therefore implemented using a material of high and permanent fire resistance, which is implemented as sufficiently resistant. In this case, the level of this resistance to fire 7 is correlated to the type of film material used and the film wall thickness used, the permanence of the resistance being correlated to a usage period of the film 11, which is considered as a very long period of time and will then run over a (finite) duration of a longer chronological interval (calculated from the beginning of usage of the film 11); for example, until the end of a time at which the film material will lose its resistance to fire 7 because of film aging or it may be expected that this resistance to fire 7 will be reduced.

The statement "insensitive" assumes being "not sensitive" [Wahrig Deutsches Wörterbuch] to (here) the flame effect of the fire 7 on the film material. Since other sensitivities of the film material, for example, to environmental conditions at the usage location of the film 11 acting on the film material from outside the insulation package 3, would be conceivable, the statement "burn-through safe" mainly comprises the statement "insensitive" to occurring fire 7, the film material used certainly also able to be and (in aircraft construction) intended to be insensitive to other influences, for example, contamination and other chemical influences in the air, to the influence of electrical hazards, to the influence of the environmental air pressure, etc.

The film 11 is accordingly to be implemented using a material of high and permanent fire resistance which is implemented as resistant and/or insensitive to occurring fire 7, because of which a film wall does not burn through because of the influence of the flaming fire 7 even with permanent effect on the film surface region and propagation of the fire 7 flaming against the film surface region may be prevented or hindered.

A further embodiment of an insulation structure for internal insulation, which is installed in a commercial aircraft, for example, is shown in FIG. 4. Accordingly, this insulation package 3, which is firstly completely enveloped—according to the pattern of FIG. 3—(only) by one single (first) burn-through safe film 11, is enveloped by a further (second) burn-through safe film 11a, which is layered lying on the first film 11. It remains open in this case whether both films 11, 11a comprise a film material of the same type. It appears important that in both cases a burn-through safe (fire-resistant) film material is used.

Even if later, as indicated clearly in FIG. 5 (by an arrow), a defined film region A of the film reinforcement (formed by, for example, two layered burn-through safe films 11, 11a), is to be implemented as film-reinforced with the aid of a third burn-through safe film 11b (by laying this film on the second film 11a), then in the sense of this definition a film layering which lies, for example, on only half of a film surface region of the second or first film 11, 11a would also be understood. The complete enveloping of the film assembly 3 would not be canceled and/or would be viewed as given by the complete enveloping of the first and/or second film 11, 11a on the insulation package 3. This film reinforcement of a defined film region A using a third burn-through safe film 11b, which would completely cover, for example, the film surface region directed (as shown in FIG. 1) toward the external skin 33 (as a type of additional protective shield), is significant because the additional third film 11b will provide additional fire protection. In addition, the double-sided existing film ends 33a, 33b of the second and third film 11a, 11b are molded onto, for example, the also existing two film ends of the first film 11 (possibly by applying pressure and simultaneously heat to the film ends to be joined).

In FIG. 6 (as in FIGS. 4 and 5), this film reinforcement by layering two burn-through safe films 11, 11a (completely enclosing the film assembly 3), which are positioned lying one on top of another, is shown, a film reinforcement implemented using multiple burn-through safe films 11, 11a, 11b, . . . 11$z_n$ being at least theoretically conceivable. As previously specified in regard to FIG. 5, a film reinforcement is implemented again around the external circumference of the second (here) film 11a with the aid of the third film 11b.

In contrast to FIG. 5, however, the following change is visible. In the example of the first film 11, (in the framework of a prior work cycle) a hose-like end section of the film 11 is formed on the end of this film 11 and outside its film envelope and on the edges of the insulation package 3. This hose-like end section is shaped into an attachment section 50 of this film 11 of (in the top view) rectangular appearance, if the hose-like shaped film walls (of the hose-like end section of the first film 11) lie one on another with their rectangular width, which corresponds to half of the hose circumference, and rectangular length, which corresponds to the extended length of the hose-like region (not used as the film envelope) of the first film 11.

The long and wide sides of the end section shaped in this way into an attachment end section 50 have a flat design (in the side view).

The final state of the Z-shaped folded attachment section 50 of the first film 11 may be approximately inferred from the detail B of FIG. 6a, or at least this Z-shaped fold of the flattened attachment end section 50 along its stretched length is clear, so that after folding the latter will have three individual flattened partial attachment end sections B11, C11, D11 of the rectangular contact surfaces—according to the pattern of FIG. 6a—which are to lie one on top of another in a final position. The hose-like end sections of the second and third films 11a, 11b may also be shaped in this way into corresponding flat attachment end sections 50a, 50b and subsequently folded in a Z-shape. Shaping the flattened partial attachment end sections of the attachment end section 50, 50a, 50b lying one on top of another (because of the Z-folding) through application of pressure and heat (with the aid of a suitable tool) into a compacted end body section of the films 11, 11a, 11b may also be considered.

Taking out a through hole from the partial attachment end sections of the attachment end sections 33, 33a, 33b and/or the compacted end body sections perpendicular to the contact surfaces, through which a fastener, such as a screw-like connection element, is guided, using which the attachment end sections 50, 50a, 50b and/or the compacted end body sections are attached to the aircraft structure, will also be provided later.

It is also to be noted that usage of the burn-through safe films 11, 11a, 11b as a fire barricade or in correlation as a fire barrier is also considered.

It is also to be noted that this burn-through safe film 11 is implemented with a carrier film, on which the fibers of a fire barrier are applied. The fibers of the fire barrier are to be implemented using ceramic fibers. Accordingly, the possibility exists that a burn-through safe film 11 or a film reinforcement is formed from the ceramic fibers, this film reinforcement reinforcing at least one defined film region A of the film 11, which would otherwise be implemented using multiple layered films 11 lying one on top of another.

LIST OF REFERENCE NUMBERS 1 core material
2 enveloping film
3 insulation package
4, 13 fastener
7 post-crash fire scenario; fire
8 aircraft structure
11, 11a, 11b burn-through safe film
17 panel insulation package
18 frame insulation package
21 hole
31 stringer
32 frame
33 external skin
40 frame girder
41 frame long side
50 attachment end section (of the film 11)
50a attachment end section (of the film 11a)
50b attachment end section (of the film 11b)
A defined film region
B11, C11, D11 partial attachment end section (of the film 11)
c spacing (of the frame 32)

What is claimed is:

1. An insulation structure for an internal insulation of a vehicle, for arrangement in an intermediate space between an internal paneling of the vehicle and an outside skin of the vehicle, the insulation structure comprising:

an insulation package arranged in the intermediate space between the internal paneling of the vehicle and the outside skin of the vehicle;
an insulation core embedded in the insulation package; and
an outer film, comprised of a film envelope and two hose-like end sections formed at opposite ends of the film envelope, each of the two hose-like end sections being outside of the film envelope and on opposite outer edges of the outer film, respectively, and extending beyond an outer periphery of the insulation package, and each of the two hose-like end sections being folded in a Z-shape such that each of the two hose-like end sections form a flat Z-fold attachment section having film fold regions laid one on top of another, and the film fold regions being formed into a compacted end body section by application of pressure and heat, the flat Z-fold attachment sections of each of the two hose-like end sections being at opposite ends of the film envelope, completely enveloping the insulation package within an enclosure formed only by the film envelope and the two flat Z-fold attachment sections, such that the outer film provides an obstruction to fire.

2. The insulation structure of claim 1,
wherein the outer film includes a material of high and permanent fire resistance, the material being sufficiently resistant such that the fire is incapable of burning through a wall of the film even in the event of permanent effect on the film surface region, and propagation of the fire is hindered or prevented.

3. The insulation structure of claim 1, further comprising a film reinforcement region applied on an external surface of a portion of the outer film.

4. The insulation structure of claim 3,
wherein the external surface of the portion of the outer film is directed toward the outside skin of the vehicle.

5. The insulation structure of claim 3,
wherein the film reinforcement region includes ceramic fibers.

6. The insulation structure of claim 3, further comprising an inner film, the inner film having an inner film envelope and two opposite -hose-like ends sealed such that the inner film envelope and the two opposite hose-like ends of the inner film completely envelope the insulation package.

7. The insulation structure of claim 6, wherein the two opposite hose-like ends of the inner film envelope are molded onto respective ones of the flat Z-fold attachment sections of the outer film, and the film reinforcement region has a first double-sided film end molded onto a first one of the flat Z-fold attachment sections and a second double-sided film end molded onto a second one of the flat Z-fold attachment sections opposite of the first one of the Z-fold attachment sections.

8. The insulation structure of claim 3, wherein the film reinforcement region is a burn-through safe film completely covering the portion of the outer film.

9. The insulation structure of claim 8, wherein the film reinforcement region extends continuously from a first one of the flat Z-fold attachment sections to a second one of the flat Z-fold attachment sections opposite of the first one of the flat Z-fold attachment sections.

10. The insulation structure of claim 9, wherein the film reinforcement region has a first double-sided film end molded onto the first one of the flat Z-fold attachment sections and a second double-sided film end molded onto the second one of the flat Z-fold attachment sections.

11. The insulation structure of claim 1,
wherein the outer film is a fire barricade or a fire barrier.

12. The insulation structure of claim 1,
wherein the outer film is implemented using a carrier film onto which fibers of a fire barrier are applied.

13. The insulation structure of claim 12,
wherein the fibers of the fire barrier include ceramic fibers.

14. The insulation structure of claim 1, further comprising an inner film, the inner film having an inner film envelope and two opposite hose-like ends sealed such that the inner film envelope and the two opposite hose-like ends of the inner films completely envelope the insulation package.

15. The insulation structure of claim 14, wherein the two opposite hose-like ends of the inner film envelope are molded onto respective ones of the flat Z-fold attachment sections of the outer film.

16. The insulation structure of claim 1, further comprising a through hole perpendicular to a contact surface of the vehicle.

\* \* \* \* \*